United States Patent [19]

Mitchell

[11] 4,109,796
[45] Aug. 29, 1978

[54] ROD AND REEL STORAGE APPARATUS

[76] Inventor: Robert C. Mitchell, 485 El Blanco Dr., Boise, Id. 83705

[21] Appl. No.: 798,748

[22] Filed: May 20, 1977

[51] Int. Cl.² .......................................... A01H 91/00
[52] U.S. Cl. .................................. 211/60 R; 43/21.2
[58] Field of Search .......................... 43/21.2, 54.5 R; 211/60-68, 89, 120; 248/511-541

[56] References Cited

U.S. PATENT DOCUMENTS

| 448,028 | 3/1891 | Hall | 43/21.2 X |
|---|---|---|---|
| 2,301,885 | 11/1942 | Laehr | 43/21.2 X |
| 3,802,652 | 9/1974 | Holton, Jr. | 43/21.2 X |

Primary Examiner—Roy D. Frazier
Assistant Examiner—Terrell P. Lewis
Attorney, Agent, or Firm—Paul F. Horton

[57] ABSTRACT

Rod and reel storage apparatus, designed for temporary or permanent storage of fishing rod and reels, which includes a pair of holders, each holder having a mounting bracket, an upwardly extending arm rotatably and removably attached to the bracket, and a loop assembly attached to the top of the arm, the loop assembly including at least one loop having an obliquely located slot at its uppermost end; the loop adapted to receive a fishing rod at a downwardly oblique angle and adapted to prevent removal of the rod at an angle upwardly parallel to the loop axis. The apparatus may also contain a hinge, substantially in the center of the arm for lateral movement of upper part of the arm and the attached loop assembly. The apparatus may also contain means for rotating the loop assembly. A coating of a resilient plastic material on the loop assembly for protecting the rods and reels from abrasion is also provided.

7 Claims, 7 Drawing Figures

ROD AND REEL STORAGE APPARATUS

BACKGROUND OF THE INVENTION

1. Field of the Invention

This invention relates, in general, to rod and reel holding devices, and in particular, to rod and reel holding devices having a pair of holders.

2. Description of the Prior Art

The desirability and convenience of fishing rod and reel holding devices has long been recongnized. Holding devices for the temporary storage of rod and reels are in great use for the purposes of preventing damage to the rod and reels, preventing tangled lines, and for organized storage thus giving more foot space—as aboard a boat.

Primary disadvantages of present holders include holders which are not conveniently removable and are therefore in the way when the surface upon which the holders are mounted is needed or desired for another purpose; holders which are not rotatable and are therefore not readily adapted to different boats and different conditions aboard boats; and holders which either are not convenient to receive a rod and reel or in which the rod and reel is easily removed by accidental means.

SUMMARY OF THE INVENTION

The present invention comprises, generally, a rod and reel holding device which includes a pair of holders, each holder including a mounting bracket, an upwardly extending arm which is rotatable in said bracket and which may be removed from the bracket, and a loop assembly attached to the uppermost part of the arm, the loop assembly including at least one loop having an obliquely located slot at its uppermost top, the loop adapted to receive a rod at a downwardly oblique angle to the axis of the loop and adapted to prevent removal of the rod at an angle upwardly parallel to the loop axis.

It is therefore an object of the present invention to provide a rod and reel holder having a pair of holders which are rotatable within their mounting brackets and which are conveniently removed from the brackets.

It is also an object of the present invention to provide a rod and reel holder which includes a loop assembly having at least one loop having an oblique slot at the uppermost end thereof for receiving a fishing rod at an oblique angle and which prevents removal of the rod at an angle upwardly parallel to the loop axis.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
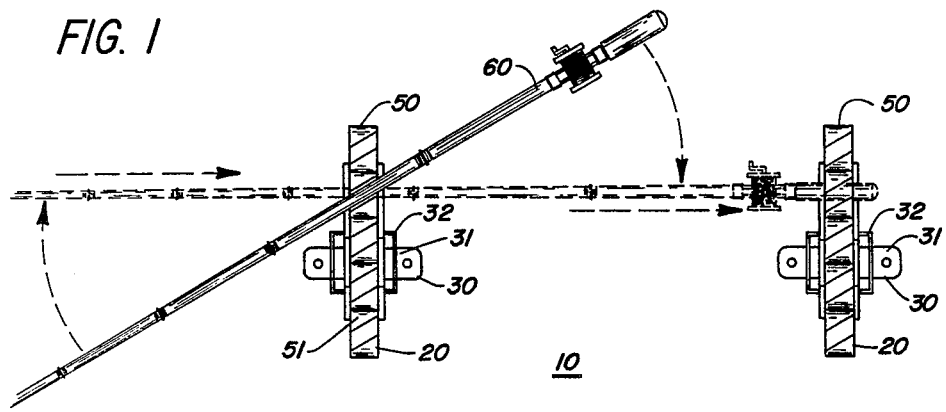
FIG. 1 is a schematic view of two of the holders of the present device shown holding rod and reels.

Referring now to drawings, and more particularly, to FIG. 1, one embodiment to be preferred of a rod and reel holder made according to the present invention is disclosed. Rod and reel storage apparatus 10 includes a pair of identical holders 20, each of the holders including a bracket assembly 30; an upwardly extending arm 40; and a loop assembly, designated generally by the numeral 50.

Figure 2:
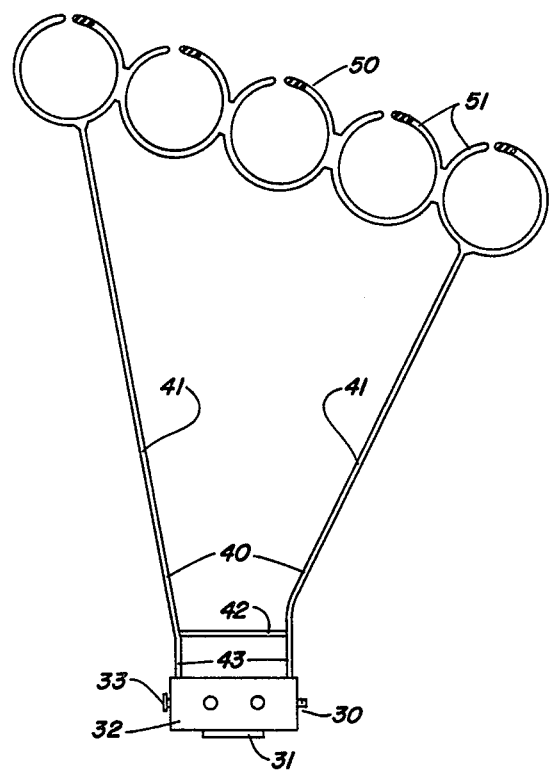
FIG. 2 is a frontal view of one embodiment of a rod and reel holder made according to the present invention.
Figure 3:
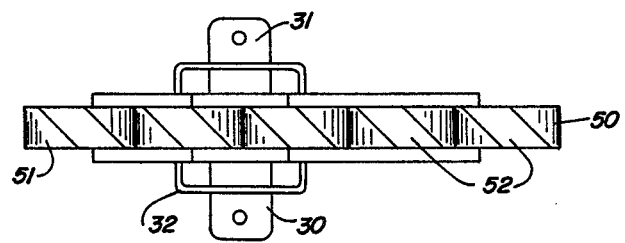
FIG. 3 is a plan view of the device of FIG. 2.

Bracket 30, as may best be seen in FIGS. 2 and 3, includes a horizontal flange 31 having a pair of holes for mounting the bracket to a flat surface. Welded to the top surface of flange 31 is square hollow casing 32. Each side of casing 32 contains two holes axially aligned with two more holes in an opposite side. Pins 33 extend through the oppositely aligned holes to secure arm 40 in the bracket as will hereinafter be explained.

Arm 40 includes two diverging branches 41 connected by cross bar 42 and a pair of parallel branches 43 downwardly depending from the cross bar. Branches 43 are spaced from one another at a distance slightly less than the internal width of casing 32 so that the branches fit snugly into the casing. Branches 43 each contain a pair of holes axially aligned in opposing branches for receiving pins 33 to hold arm 40 securely in place relative to bracket 30. It is to be noted that mounting bracket 30 can be permanently installed and that the arm with attached loop is easily removable from the bracket by simply pulling pins 33. It is also to be noted that arm 40 is freely rotatable within bracket 30 by simply lifting the arm and replacing it either in reverse position or at right angles.

Loop assembly 50, in the preferred embodiment, includes five loops welded together into an aligned structure, as shown in the figures. Referring now, to FIGS. 2 and 3 in particular the structure of an individual loop 51 may be seen. Loop 51 is substantially ring shaped having a slot 52 cut obliquely into the top surface. It will be seen then that a rod and reel designated by the numeral 60 may be inserted into a loop at a downwardly oblique angle to the loop axis and parallel with the slot. The handle may then be inserted in a corresponding loop on a second holder as seen in FIG. 1. The handle is slid into the loop in alignment with the loop axis. With the rod thusly stored, it is impossible to remove the rod without first removing the handle from the loop and then lifting the rod portion through the slot in a manner reversed from the placement of the rod. The loop assembly is preferably fastened to the arm at the bottom portion of the exterior loops as shown in FIG. 2. The loop assembly may be coated with resilient plastic material for protecting the rods and reels from abrasion.

Figure 4:
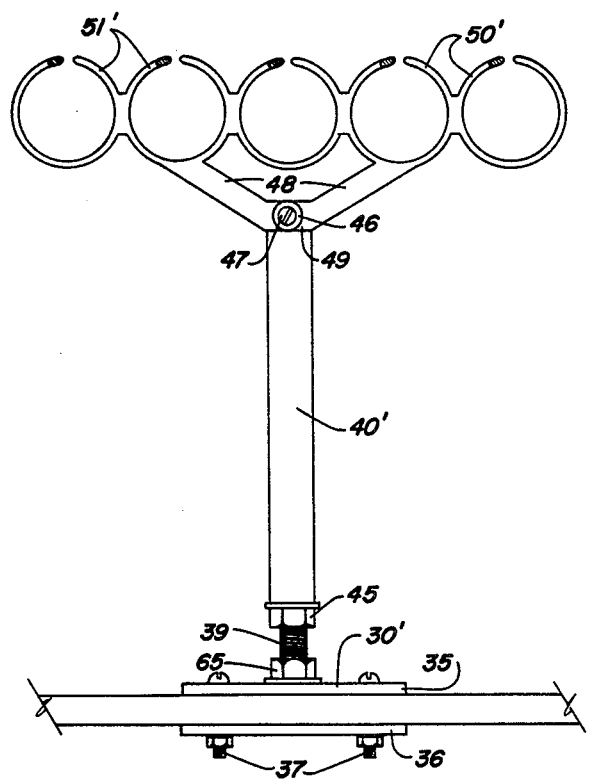
FIG. 4 is a frontal view of a second embodiment of the present invention.
Figure 5:
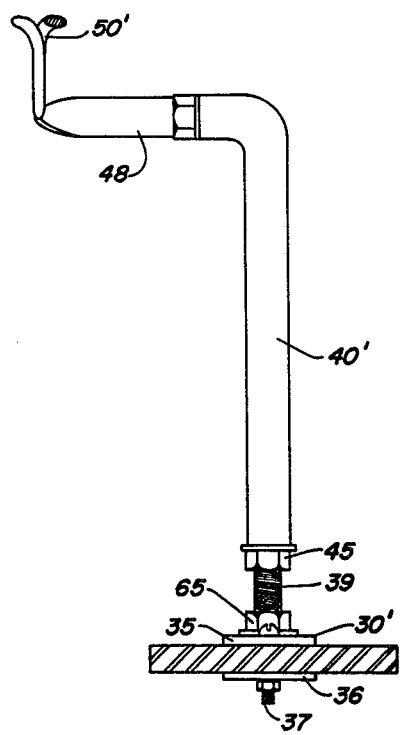
FIG. 5 is an elevated view of the device of FIG. 4.

Referring now to FIGS. 4 and 5, a second preferred embodiment of a device made according to the present invention is disclosed. As in the previous embodiment, two of the holders are required for holding the rod and reels. Since the construction of the two holders are identical a discription of one of the holders shall suffice. Each holder includes mounting assembly 30'; arm 40' and loop assembly 50'.

Mounting bracket 30' includes top plate 35, bottom plate 36, and mounting screws 37. Mounted on top of top plate 35 and upwardly extending is threaded bolt 39.

Arm 40' contains at its lowermost terminal end, a nut 45 which mates with threaded bolt 39. As may be seen arm 40' with attached loop assembly 50' are readily removed from the mounting bracket by simply unscrewing nut 45 from bolt 39. A second nut 65 is located distal to nut 45 on bolt 39. Nut 65 may be screwed up tight against nut 45 as a clamping means thereby holding arm 40' in a secure fixed position relative to bracket 30'.

Figure 6:
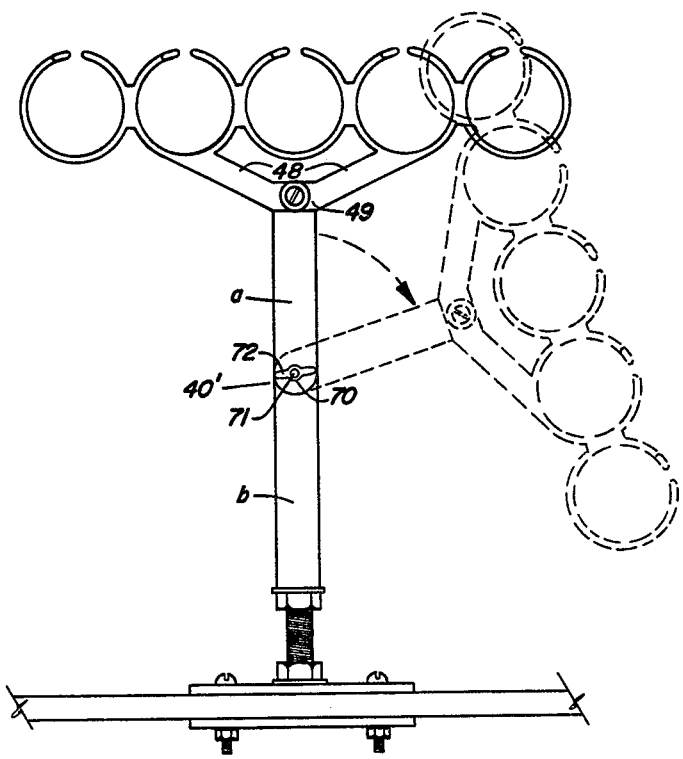
FIG. 6 is a frontal view of the device of FIG. 4 showing a modification in which the arm contains a hinge for pivoting.

As may be seen in FIG. 6, 40' may include hinge joint 70 which permits lateral movement of the top portion of arm 40' designated "a" relative to the bottom portion of arm 40' designated "b". The hinge may be fixed in any desired position by means of screw 71 and wing nut 72. In the preferred embodiment, arm 40', at its uppermost end, is bent at substantially a right angle to the vertical, as may best be seen in FIG. 5. Arm 40' at its upper end may contain arm branches 48 and a cross piece 49 to provide added strength. Cross piece 49 is rotatably attached to the uppermost terminal portion of "a" by means of screw 47 and washer 46. The free, terminal ends of branches 48 are secured to the loop assembly at the base of the loops by means of welding or otherwise. Loop assembly 50' includes five loops designated 51' having obliquely located slots at their uppermost ends. Loops 51' are attached at their side portions to one another in aligned relationship by welding.

Figure 7:
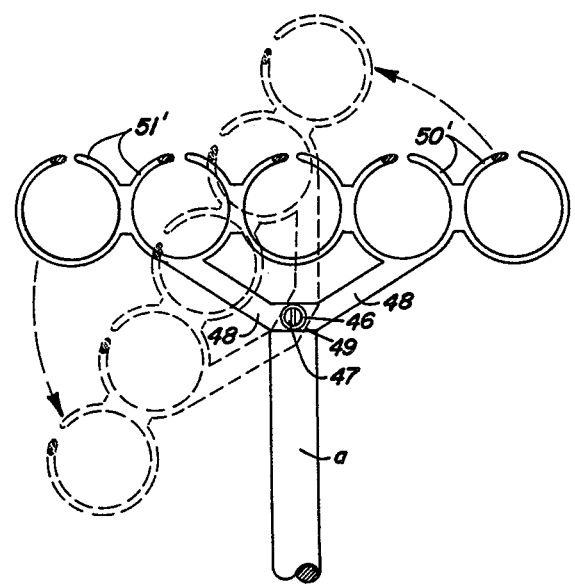
FIG. 7 shows the device of FIG. 4 showing the loop assembly in rotated position.

Referring now to FIG. 7 a holder as above described showing rotation of the loop assembly about an axis transverse to upwardly extending arm "a" may be seen. By orienting the second holder in the same manner it will readily be seen that the rod and reel holding device can be adapted to a variety of conditions to permit storage of the rod and reels.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Rod and reel holding apparatus comprising a pair of holders, each holder including;

a mounting bracket;
   an upwardly extending arm rotatable about its longitudinal axis and removably attached to said bracket;
   a loop assembly attached to the uppermost terminal free end of said arm, said loop assembly including at least one loop having an obliquely located slot at substantially the uppermost end thereof, said loop adapted to receive a rod inserted downwardly in alignment with said slot and adapted to prevent upward removal of the rod unless aligned with said slot.

2. The apparatus of claim 1, wherein said mounting bracket includes a mounting plate having an upwardly extending threaded bolt, and wherein said arm includes a base portion journaled for rotation on said bolt.

3. The apparatus of claim 2, further comprising clamping means engaging said threaded bolt to secure said arm in a selected position.

4. The apparatus of claim 1, wherein said arm includes hinge means for lateral movement of the upper portion of said arm.

5. The apparatus of claim 1, further comprising rotation means connecting the uppermost terminal end of said arm to said loop assembly for rotation of said loop assembly about an axis transverse to said upwardly extending arm.

6. The apparatus of claim 1, wherein said arm includes two branches connected by a cross bar, said branches being parallel to one another below said cross bar to define a base portion, and said branches being divergent above said cross bar to define a top portion, said base portion having a pair of oppositely disposed and axially aligned holes in each branch, and said top portion securedly engaging said loop assembly; and wherein said mounting bracket includes a flat plate, means for securing said plate to a supporting structure, and a substantially square hollow casing upwardly extending from said plate, said casing including at least one hole in each side thereof, the holes being axially aligned with the hole in the oppositely disposed side of the casing and axially aligned with the holes in each branch of the base portion of said arm; and at least one pin removably extending through oppositely aligned holes of said casing and the base portion of said arm to secure said arm in said bracket.

7. The apparatus of claim 1, wherein said loop assembly includes a coating of resilient, plastic material.

* * * * *